US010701466B1

United States Patent
Leclerc et al.

(10) Patent No.: US 10,701,466 B1
(45) Date of Patent: Jun. 30, 2020

(54) OPTICAL PACKET SWITCHING BASED ON TRAFFIC PROPERTIES

(71) Applicant: Nokia Solutions and Networks Oy, Espoo (FI)

(72) Inventors: Brice Leclerc, Arpajon (FR); Olivier Marcé, Massy (FR); Dominique Chiaroni, Antony (FR); Bogdan Uscumlic, Bures-sur-Yvette (FR)

(*) Notice: Subject to any disclaimer, the term of this patent is extended or adjusted under 35 U.S.C. 154(b) by 0 days.

(21) Appl. No.: 16/382,541

(22) Filed: Apr. 12, 2019

(51) Int. Cl.
*H04J 14/00* (2006.01)
*H04Q 11/00* (2006.01)

(52) U.S. Cl.
CPC ..... *H04Q 11/0066* (2013.01); *H04Q 11/0071* (2013.01); *H04Q 2011/0073* (2013.01); *H04Q 2011/0088* (2013.01)

(58) Field of Classification Search
CPC ........... H04Q 11/0066; H04Q 11/0003; H04Q 11/0005; H04Q 11/0067; H04J 14/02; H04J 14/0201; H04J 14/0267
USPC ........ 398/45, 46, 47, 48, 49, 50, 51, 53, 54, 398/55, 56, 57, 58, 79, 83; 370/390, 352, 370/389, 432, 395.51, 395.21, 216, 217, 370/225, 228
See application file for complete search history.

(56) References Cited

U.S. PATENT DOCUMENTS

| | | | | |
|---|---|---|---|---|
| 2006/0008273 A1* | 1/2006 | Xue | ............ | H04L 45/00 398/51 |
| 2012/0251109 A1* | 10/2012 | Mori | ............ | H04Q 11/0005 398/51 |

OTHER PUBLICATIONS

M. Asghari, "Silicon Photonics: A Low Cost Integration Platform for Datacom and Telecom Applications", Conference on Optical Fiber Communication/National Fiber Optic Engineers Conference (OFC/NFOEC), Feb. 2008, 10 pages.
T. Chu et al., "Fast, High-radix Silicon Photonic Switches", Optical Fiber Communication Conference,OSA Technical Digest (online), Optical Society of America, 2018, 3 pages.
A. Nasrallah et al., "Ultra-Low Latency (ULL) Networks: The IEEE TSN and IETF DetNet Standards and Related 5G ULL Research", IEEE Communications Surveys & Tutorials, vol. 21, Issue 1, Sep. 10, 2018, 59 pages.
M. Ma et al., "Providing deterministic quality-of-service guarantees on WDM optical networks", IEEE Journal on Selected Areas in Communications, vol. 18, Issue 10, Oct. 2000, 12 pages.
G. Rouskas et al., "Optical Packet Switching", Emerging Optical Network Technologies, pp. 111-127, 2003.

* cited by examiner

*Primary Examiner* — Hanh Phan (57) ABSTRACT

A node is configured for deployment in an optical network. The node includes an analog switch for routing an optical packet between input ports and output ports. The node also includes digital processing circuitry configured to generate first configuration information based on the optical packet prior to providing the optical packet to the analog switch. The analog switch is configured to route the optical packet between the input ports and the output ports based on the first configuration information in response to the optical packet arriving at the node in a first time interval. The optical packet is not processed by the digital processing circuit or results of processing are not used to configure the analog switch during a second time interval. The analog switch routes the optical packet between the input and output ports based on second configuration information during the second time interval.

23 Claims, 5 Drawing Sheets

OPTICAL PACKET SWITCHING BASED ON TRAFFIC PROPERTIES

BACKGROUND

Optical switches typically are implemented for routing optical signals through an optical network such as the optical fiber infrastructure deployed in metropolitan, regional, national, or international areas. Conventional optical transmission and switching is performed in an optical network using wavelength division multiplexing (WDM). Optical switching in a WDM-based network uses optical-to-electrical-to-optical (OEO) conversion, in which an optical switch receives an optical signal, converts the optical signal to an electrical (digital) signal, determines routing information based on the digital signal, and converts the electrical signal back to an optical signal for subsequent transmission. Optical switches that use OEO conversion consume a significant amount of energy to perform the conversion and require a significant amount of time, which increases latency and leads to electronic bottlenecks. One alternative is optical packet switching (OPS) that allows an optical switch to route an input optical packet to an optical output port without converting the entire packet into an electrical/digital signal. In some cases, an optical header is converted into a digital signal that includes information used to configure the optical switch to route an optical payload without converting the optical payload into an electrical/digital signal. An OPS node is typically smaller in size and has reduced energy consumption relative to implementing corresponding functionality in OEO-based node. The OPS nodes perform traffic grooming to combine small optical flows into larger units that are processed as a single optical flow, as well as having better bandwidth usage than reconfigurable optical add-drop multiplexer (ROADM) switches because the packet switching ability of the OPS node supports time division multiplexing.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Fifth Generation (5G) communication systems enable applications such as virtual reality, augmented reality, reliable remote operation of machines, factory automation, network-assisted routing of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. One key feature of 5G communication systems is Ultra-Low Latency Reliable Communication (ULLRC) that targets end-to-end latencies of 1 millisecond (ms) (e.g., to support factory automation applications) and reliabilities of at least 99.999% (e.g., for automotive traffic control applications such as platooning). Another key feature of 5G communication systems is that most of the signal processing is done in the network by cloud servers rather than close to the radio antennas that support wireless communication, e.g., with IoT devices. The cloud server architecture is referred to herein as Cloud Radio Access Network (C-RAN). The latency requirements for C-RAN are even more stringent: round trip time budgets are expected to be in the range of 200 to 500 microseconds (µs). Although described herein in the context of a 5G communication system, the C-RAN architecture is also implemented in other communication systems such as Fourth Generation (4G) communication systems. A third key feature of 5G communication systems is network slicing, which permits operators to allocate resources of all types (network, CPU, storage) to a given service, without interfering with other services provided by the system.

The stringent latency requirements of ULLRC and C-RAN are satisfied in digital communication systems using "deterministic networking." Packet arrival times and latencies are known accurately in advance in a deterministic network. One deterministic networking technique is time-aware shaping of packets that are scheduled for transmission by a transmission scheduler that selects packets for scheduling from a set of ingress queues. A gate control list (GCL) identifies the ingress queues that are considered by the transmission scheduler in a sequence of time intervals that are referred to as traffic windows. The pattern of ingress queues that are considered in each traffic window is referred to as a gate control entity (GCE). The GCL is therefore a list of GCEs for the sequence of traffic windows. Different flows are mapped to different ingress queues. The GCL defines time-aware traffic windows in which only packets from ingress queues corresponding to specified flows are allowed to be transmitted. For example, the GCL can be configured so that only a first queue associated with a first flow is considered by the scheduler in a time window that corresponds to the time that a first frame in the first flow is expected to arrive in the first queue. All other queues are closed by the GCL in that time window. The scheduler then schedules the only available frame—the first frame in the first queue—for transmission, thereby avoiding collisions and the resulting transmission delays.

As discussed above, an optical switch is configured to route an optical packet based on information included in an optical header of the optical packet. Implementing deterministic networking in a conventional optical network therefore requires OEO conversion of at least the header of the optical packet. Processing of the optical packet, including the OEO conversion, increases the latency of the packet and increases uncertainty in the processing time and can render transmission of the optical packet non-deterministic, which is contrary to the goal of reducing network latency and nullify jitter using deterministic networking.

FIGS. 1-5 disclose embodiments of an optical network that implements deterministic networking of optical packets by selectively providing an optical packet directly to an optical switch or converting at least an optical header of the optical packet to a digital signal (e.g., for address resolution or contention resolution) prior to providing at least an optical payload of the optical packet to the optical switch. Some embodiments of a node that includes the optical switch also include digital processing circuitry configured to convert the optical header to the digital signal and perform address resolution or contention resolution for the optical packet based on information in the digital signal. The node provides a first (deterministic or analog) path from one or more input ports to an analog switch and a second (stochastic or digital) path from the input ports to the digital processing circuitry. The node is configured to provide optical packets that arrive during a first set of time intervals directly to the analog switch via the first path. The analog switch is configured to route the optical packets from the input ports to one or more output ports based on first configuration information associated with the first set of time intervals. The node is also configured to provide optical packets that arrive during a second set of time intervals to the digital processing circuitry, which extracts second configuration information from a header in the optical packet. In some embodiments, an optical packet arriving at an input port of the node is duplicated (e.g., the optical signal is split) and copies of the optical packet are provided to the first (analog) path and the second (digital) path. The first path is selected during the first set of time intervals and the second path is selected during a second set of time intervals. On each input port of the node, the first and second sets of time intervals are mutually exclusive, as discussed below.

The analog switch is configured based on the second configuration information. For example, the analog switch can be configured to route the optical packet based on an address extracted from the header. Some embodiments of the digital processing circuitry also perform contention resolution based on information in the header, e.g., using optical buffering, wavelength conversion, or deflection routing. The results of the contention resolution are used in combination with the extracted address to configure the analog switch. The digital processing circuitry provides an optical payload of the optical packet to the analog switch, which routes the optical packets from the input ports to the output ports based on the second configuration information. In some embodiments, the first set of time intervals is partitioned into subsets that are associated with different configurations of the analog switch so that the optical packets that arrive during the subsets are routed to different output ports.

Figure 1:
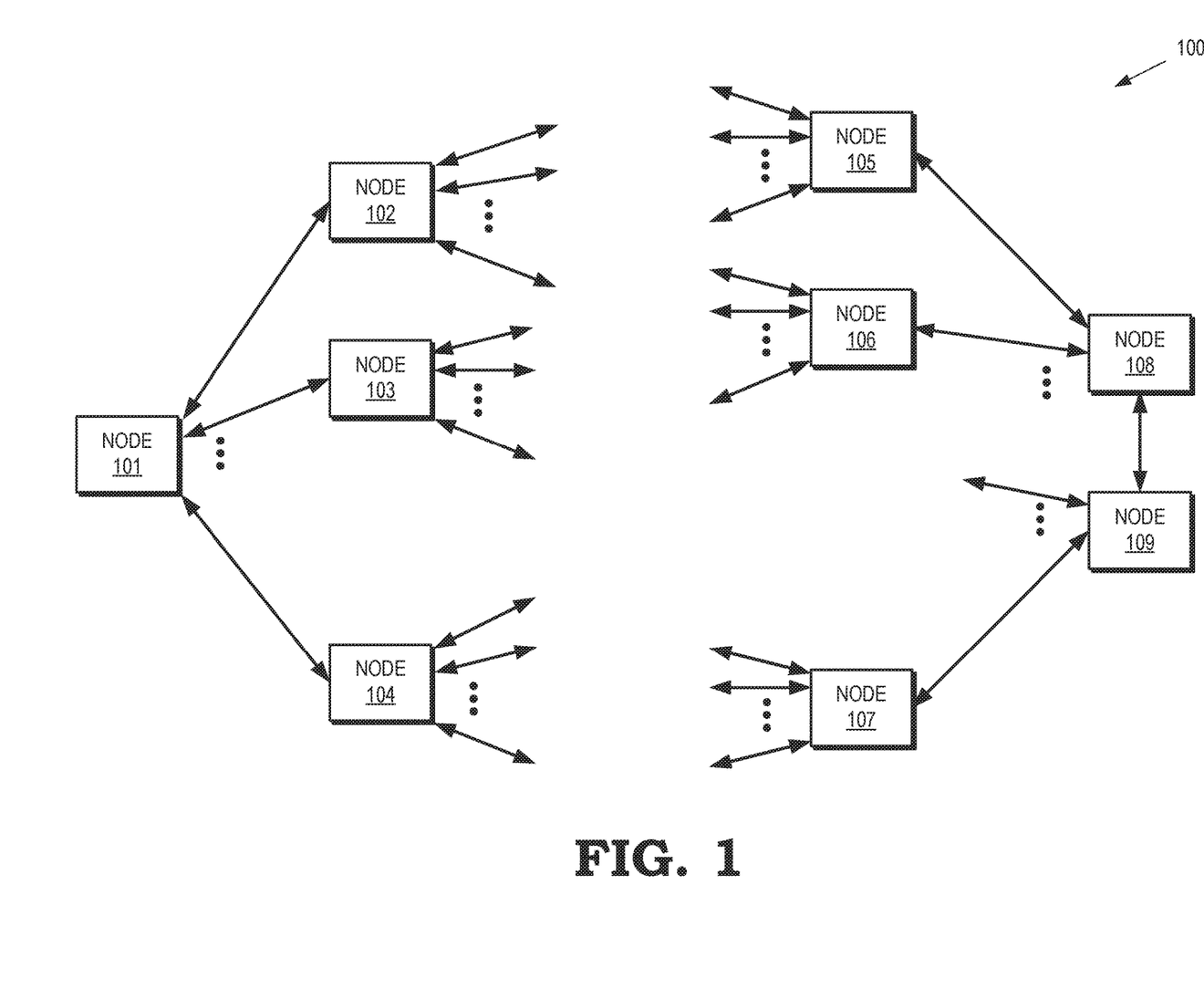
FIG. 1 is a block diagram of an optical network according to some embodiments.

FIG. 1 is a block diagram of an optical network 100 according to some embodiments. The optical network 100 includes a set of interconnected optical nodes 101, 102, 103, 104, 105, 106, 107, 108, 109, which are collectively referred to herein as "the optical nodes 101-109." The connections or links between the optical nodes 101-109 convey optical packets in the form of optical (or photonic) signals transmitted between the optical nodes 101-109. Some embodiments of the optical network 100 are therefore implemented using optical fibers to interconnect the optical nodes 101-109.

The optical nodes 101-109 include optical switches that are used to route the optical packets from a source node to a destination node via one or more transit nodes. As discussed herein, the use of optical packet switching (OPS) techniques in the optical nodes 101-109 reduces the size of the optical nodes 101-109 and decreases energy consumption relative to electrical (or electronic) packet switching in mesh or ring networks, as well as supporting optical traffic grooming and improving bandwidth usage. However, other optical switching technologies are implemented in some embodiments of the optical nodes 101-109, such as an optical switch controlled by a control plane instead of packets headers. Some embodiments of the optical nodes 101-109 include other optical elements such as optical-electrical-optical (OEO) conversion circuits, optical amplifiers, lasers, light emitting diodes (LEDs), multiplexers, and the like, although these elements are not shown in FIG. 1 in the interest of clarity. The optical network 100 can be implemented as a mesh network, a ring network, or other network architecture.

The optical nodes 101-109 provide different switching paths for stochastic traffic and deterministic traffic. Arrival times of the optical packets that are part of deterministic flows are known in advance and so the optical nodes 101-109 are preconfigured to treat optical packets as deterministic if they arrive during time intervals that include the known arrival times for one or more packets of deterministic flows. Optical packets that arrive outside of the known arrival times for the deterministic flows are treated as stochastic traffic. In some embodiments, an optical packet arriving at an input port of one of the optical nodes 101-109 is duplicated and copies of the optical packet are provided to the analog path that allows optical packets to bypass digital processing and the digital path that includes the digital processing. The analog path is enabled (and the digital path disabled) during first time intervals associated with the known arrival times in the deterministic flows and the digital path is enabled (and the analog path disabled) during second time intervals that do not include the known arrival times.

In some embodiments, optical packets that arrive at the optical nodes 101-109 during a digital time interval are processed by a separate module that performs operations including address and contention resolution. The optical switches in the optical nodes 101-109 are configured based on information extracted from the optical packets in the stochastic flows and then the optical packets in the stochastic flows are routed through the optical switches based on the configuration information. Some embodiments of the optical nodes 101-109 configure their corresponding optical switches based on first configuration information extracted from a first portion (e.g., an optical header) of the optical packet in response to receiving the optical packet during a first time interval. A second portion (e.g., an optical payload) of the optical packet is then provided to the optical switch for routing to one or more output ports of the optical switch.

In contrast, optical packets that arrive at the optical nodes 101-109 during an analog time interval bypass the address/contention resolution module. For example, if an optical packet arrives at one of the optical nodes 101-109 during a second time interval, the optical packet is provided directly to the optical switch, e.g., without being digitally processed in the address/contention module. The optical switch is therefore not configured based on information included in the optical packet. Instead, the optical switch is preconfigured prior to the beginning of the analog time interval. For example, the optical switch can be configured using second configuration information such as the known arrival times of optical packets in a deterministic flow prior to the second time interval. The optical packets that are provided directly to the optical switch during the analog time interval are therefore routed based on the second configuration information.

Figure 2:
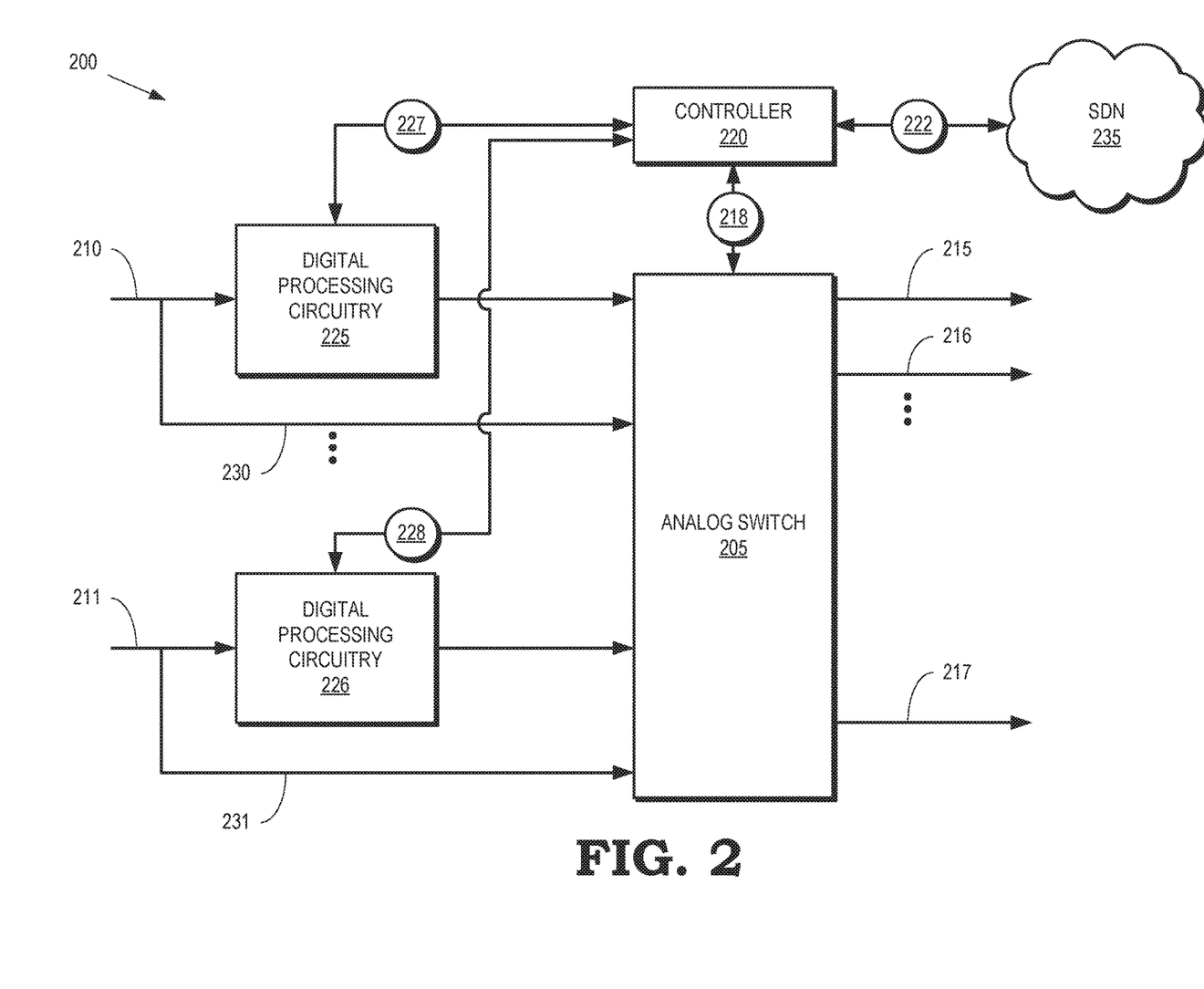
FIG. 2 is a block diagram of an optical node that implements an analog path and a digital path for handling deterministic and stochastic traffic, respectively, according to some embodiments.

FIG. 2 is a block diagram of an optical node 200 that implements an analog path and a digital path for handling deterministic and stochastic traffic, respectively, according to some embodiments. The optical node 200 is used to implement some embodiments of the optical nodes 101-109 shown in FIG. 1. The optical node 200 includes an analog switch 205 that routes optical packets from input ports 210, 211 of the optical node 200 to output ports 215, 216, 217 of the optical node 200. Although two input ports 210, 211 and three output ports 215-217 are shown in FIG. 2, some embodiments of the optical node 200 include more or fewer input ports and more or fewer output ports. The analog switch 205 is configured using configuration information 218 received from a controller 220. The configuration information 218 includes information that defines optical pathways over an optical switching fabric between the input ports 210, 211 and the output ports 215-217.

The optical node 200 also includes digital processing circuitry 225, 226 that extracts information from optical packets. The digital processing circuitry 225, 226 is implemented using one or more processors, application-specific integrated circuits (ASICs), field programmable gate arrays (FPGAs), and the like. Some embodiments of the digital processing circuitry 225, 226 use OEO conversion of at least a portion of the packet to a digital format. For example, the digital processing circuitry 225, 226 can convert an optical header of an optical packet into an electrical (digital) format. Addressing information including a source and destination addresses or labels for the optical packet are extracted from the digital version of the optical header. The digital processing circuitry 225, 226 performs address resolution for the optical packet using the extracted addressing information. The digital processing circuitry 225, 226 then generates and provides configuration information 227, 228 to the controller 220, which uses the configuration information 227, 228 to configure or modify the switching fabric in the analog switch 205 based on the configuration information 218. The analog switch 205 is configured so that the optical packet (or portion thereof) that is received from the digital processing circuitry 225, 226 is routed to the appropriate output port 215-217 indicated in the configuration information 227, 228. Although the illustrated embodiment of the digital processing circuitry 225, 226 performs OEO conversion, address and contention resolution can be realized using optical processing, electronic processing, or a hybrid of optical and electronic processing.

Some embodiments of the digital processing circuitry 225, 226 also perform contention resolution using the information extracted from the optical packet. For example, the digital processing circuitry 225 can use information extracted from an optical packet to determine that the optical packet will use the same resources of the analog switch 205 as another optical packet (or a packet from a deterministic flow) that is concurrently processed by the digital processing circuitry 226. Contention can occur between two (or more) optical packets in a stochastic flow or between an optical packet in a stochastic flow and an optical packet in a deterministic flow, e.g., the stochastic and deterministic optical packets can be contending on the output port 215. The digital processing circuitry 225, 226 generates configuration information 227, 228 including information relative to the contention between the optical packets. The configuration information 227, 228 is provided to the controller 220, which uses the configuration information 227, 228 to generate control signaling for the digital processing circuitry 225, 226 that then performs contention resolution based on the control signaling. The controller 220 also uses the configuration information 227, 228 to generate the information 218 that configures or modifies the switching fabric in the analog switch 205 so that the configuration of the analog switch 205 is consistent with the contention resolution.

Based on the control signals provided by the controller 220, the digital processing circuitry 225, 226 performs contention resolution for the two optical packets that are contending for the same resources. For example, optical buffering can be used to delay one of the packets, wavelength conversion can be used to switch one of the packets to a different optical channel or subchannel, or deflection routing to route the two packets to different output ports 215-217. In some cases, the digital processing circuitry 225, 226 therefore uses the results of the contention resolution in combination with the extracted addresses to generate the configuration information 227, 228 that is used to configure the analog switch 205.

The optical node 200 also provides direct, optical paths 230, 231 from the input ports 210, 211 to the analog switch 205. Optical packets that travel along the optical paths 230, 231 are not converted to an electrical or digital format (e.g., using OEO conversion). Consequently, the optical packets that arrive at the analog switch 205 via the optical paths 230, 231 are routed to the output ports 215-217 based upon the current or pre-existing configuration of the analog switch 205. In some embodiments, the controller 220 receives configuration information 222 from a software defined network (SDN) 235 and uses the received configuration information 222 to generate the configuration information 218 that is used to configure the analog switch 205. Preconfiguring the analog switch 205 to route optical packets received over the optical paths 230, 231 is used to support deterministic networking.

Optical packets in a deterministic flow arrive at the optical node 200 at predetermined arrival times, such as arrival times within a predetermined time interval. Since the arrival times of the optical packets are known, deterministic flows are distinguished from stochastic flows based on their arrival times. For example, optical packets that arrive at the input port 210 of the optical node 200 within a first set of time intervals associated with the deterministic flow are treated as deterministic packets (even if they are stochastic packets) and optical packets that arrive at the input port 210 of the optical node 200 within a second set of time intervals (mutually exclusive to the first set) are treated as stochastic packets. In some embodiments, different sets of time intervals are determined for different input ports 210, 211 of the optical node 200. Different time intervals can also be associated with different wavelengths of the optical packets that are received at a particular input port of the optical node 200. Thus, the time intervals for different input ports or different wavelengths do not need to be the same.

Prior to the beginning of a time interval in the first set, the controller 220 provides configuration information to the analog switch 205 that is used to configure the analog switch 205 to route optical packets in the deterministic flow to the appropriate output ports 215-217. Optical packets that arrive at the input ports 210, 211 during the first set of time intervals (which are not necessarily the same for the input ports 210, 211) bypass the digital processing circuitry 225, 226 and are directed along the optical paths 230, 231. These optical packets are routed through the analog switch 205 to the output ports 215-217 based on the configuration information that was previously used to configure the analog switch 205. Some embodiments of the SDN 235 provide the configuration information that is used to preconfigure the analog switch 205. Thus, the deterministic optical packets are received and transited in an optically transparent manner without resorting to a centralized control plane. The digital processing circuitry 225, 226 is not used to extract information from the optical packets, e.g., no OEO conversion is performed, which reduces energy consumption and latency for the optical packets received during the first set of time intervals.

Optical packets that arrive at the input ports 210, 211 during the second set of time intervals (which are not necessarily the same for the input ports 210, 211) are treated as stochastic traffic and routed using information extracted from the optical packets by the digital processing circuitry 225, 226, as discussed above. Alternatively, some embodiments of the node 200 monitor a local, out-of-band, control channel associated with the incoming stochastic optical packets. The control channel is used to convey routing information for the stochastic optical packets. Thus, the control channel is converted to a digital signal, which is decoded by the node 200 to generate the routing information, which is used to configure the analog switch 205.

Some embodiments of the node 200 duplicate the optical packets arriving at the input ports 210, 211 and concurrently provide the copies to the digital paths including the digital processing circuitry 225, 226 and the optical paths 230, 231 that bypass the digital processing circuitry 225, 226. The controller 220 configures the analog switch 205 to accept and process signals from the digital or analog path based on the time intervals associated with the input ports 210, 211. For example, the controller 220 generates configuration information provided by the digital processing circuitry 225 and configures the analog switch 205 to process signals received from the digital processing circuitry 225 based on the configuration information, thereby enabling the digital path (and disabling the analog path) during time intervals associated with stochastic flows arriving at the input port 210. For another example, the controller 220 configures the analog switch 205 to process signals received from the optical path 230, thereby enabling the analog path (and disabling the digital path) during time intervals associated with deterministic flows arriving at the input port 210.

Figure 3:
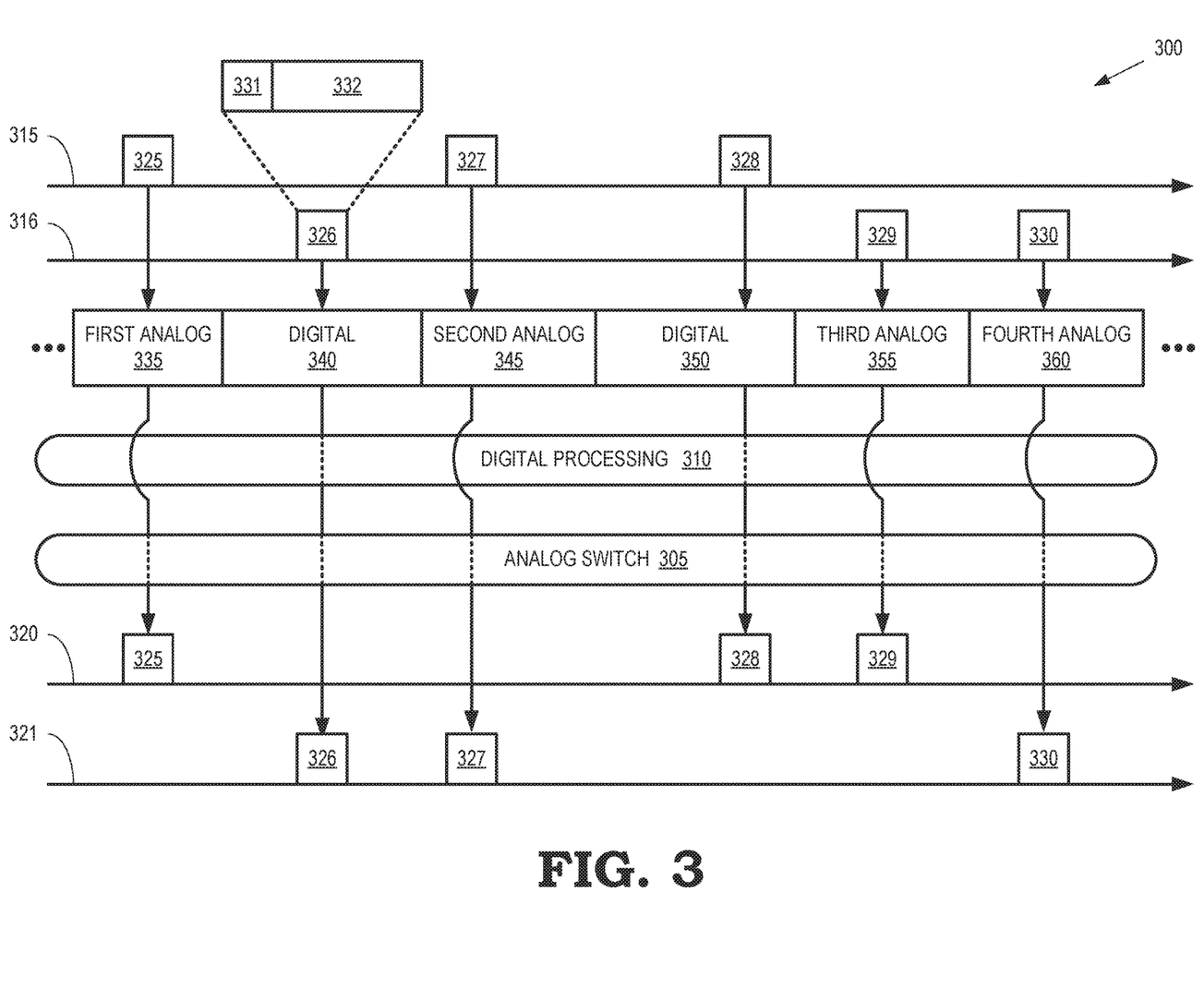
FIG. 3 is a timing diagram for a node that selectively transmits optical packets based on arrival times of the optical packets according to some embodiments.
Figure 5:
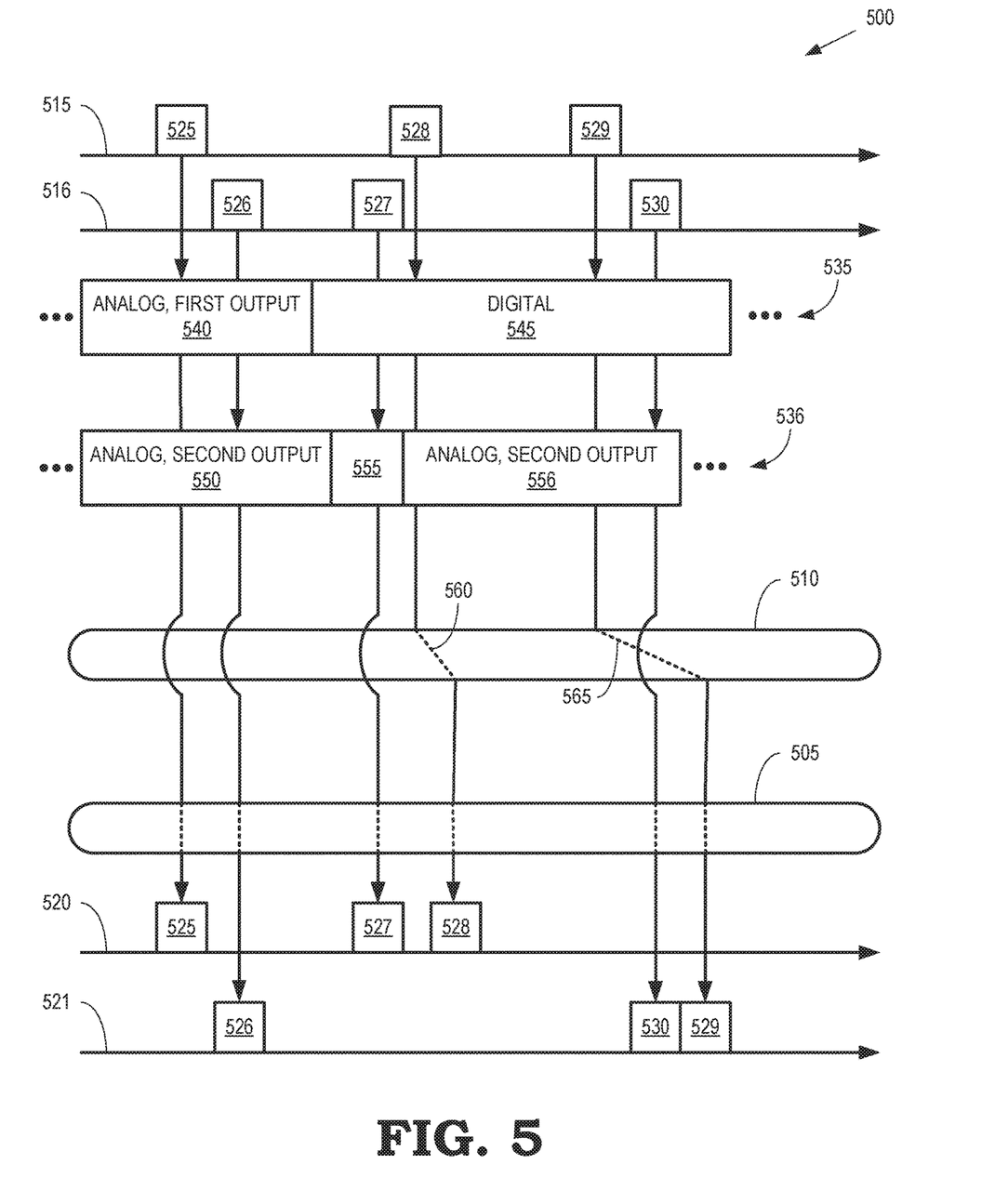
FIG. 5 is a timing diagram that illustrates timing delays along different paths in a node that selectively transmits optical packets based on arrival times of the optical packets according to some embodiments.

FIG. 3 is a timing diagram 300 for a node that selectively transmits optical packets based on arrival times of the optical packets according to some embodiments. The node includes digital and analog transmission paths that represent transmission paths in some embodiments of the optical node 200 shown in FIG. 2. The node includes an analog switch 305 such as the analog switch 205 shown in FIG. 2. The node also includes digital processing circuitry 310 such as the digital processing circuitry 225, 226 shown in FIG. 2. The node further includes input ports 315, 316 and output ports 320, 321, which are represented as arrows to indicate arrival times at the corresponding ports. Time increases from left to right as indicated by the direction of the arrows representing the input ports 315, 316 and the output ports 320, 321. In the interest of clarity, time delays such as propagation times, processing times in the digital processing circuitry 310, and times required for contention resolution are not illustrated in FIG. 3. These time delays are illustrated in FIG. 5 below.

A sequence of optical packets 325, 326, 327, 328, 329, 330 (collectively referred to herein as "the optical packets 325-330") arrives at the input ports 315, 316. The optical packets 325-330 have different arrival times at the node. In some embodiments, the optical packets 325-330 are duplicated and the copies are routed concurrently along the digital and analog transmission paths. The copies are selectively processed in the digital processing circuitry 310 and the analog switch 305 based on their arrival times. In the interest of clarity, only the path that is enabled is shown for the optical packets 325-330. For example, as discussed below, the copy of the optical packet 325 on the analog path is provided to the output node 320 and so only processing along the analog path is illustrated in FIG. 3. In other embodiments, the optical packets 325-330 are selectively routed along either the digital or the analog transmission path based on the arrival time of the optical packets 325-330. Some embodiments of the optical packets 325-330 include an optical header and an optical payload such as the optical header 331 and the optical payload 332 of the optical packet 325. The deterministic optical packets 325, 327, 329, 330 are not required to include an optical header (or they may include an optical header having less or different information than the optical header 331) because the deterministic optical packets 325, 327, 329, 330 are routed through the analog switch 305 according to predetermined configuration information.

The optical packet 325 arrives during a first analog time interval 335 and therefore the optical packet 325 is not processed by the digital processing circuitry 310 or the optical packet 325 are processed by the digital processing circuitry 310 but the results of the processing are not used to configure the analog switch 305. In some embodiments, the optical packet 325 is processed to perform a posteriori checks such as security checks. The analog switch 305 routes the optical packet 325 to the output port 320 based on configuration information used to configure the analog switch 305 for routing during the first analog time interval 335. The configuration information determines a mapping between the input ports 315, 316 and the output ports 320, 321. Different mappings between the input ports 315, 316 and the output ports 320, 321 are associated with different time intervals, as discussed below.

The optical packet 326 arrives at the input port 316 during a digital time interval 340. Consequently, the copy of the optical packet 326 that was directed to the digital processing circuitry 310 is processed by the analog switch 305. The digital processing circuitry 310 extracts information from the optical packet 326 that is used to configure the analog switch 305. The optical packet 326 (or an optical payload thereof) is provided to the analog switch 305, which routes the optical packet 326 (or optical payload) to the output port 321.

The optical packet 327 arrives at the input port 315 during a second analog time interval 345 and therefore is not processed by the digital processing circuitry 310 or the processing is not used to configure the analog switch 305. The second analog time interval 345 is associated with different configuration information than the first analog time interval 335 and therefore the analog switch 305 is preconfigured into a different configuration during the second analog time interval 345 than in the first analog time interval 335, e.g., the analog switch 305 is configured to route optical packets 327 from the input port 315 to the output port 321 during the second analog time interval 345. The analog switch 305 routes the optical packet 327 to the output port 321 based on the configuration information.

The optical packet 328 arrives at the input port 315 during a digital time interval 350. Consequently, the copy of the optical packet 328 that was directed to the digital processing circuitry 310 is processed by the analog switch 305. The digital processing circuitry 310 extracts information from the optical packet 328 that is used to configure the analog switch 305. In the illustrated embodiment, information in an optical header of the optical packet 328 includes different addressing information than an optical header of the optical packet 326, which results in a different configuration of the analog switch 305. The optical packet 328 (or an optical payload thereof) is provided to the analog switch 305, which routes the optical packet 328 (or optical payload) to the output port 320.

The optical packet 329 arrives at the input port 316 during a third analog time interval 355 and is therefore not processed by the digital processing circuitry 310 or the results of the processing are not used to configure the analog switch 305. The analog switch 305 routes the optical packet 329 to the output port 320 based on predetermined configuration information used to configure the analog switch 305 for routing received optical packets from the input port 316 to the output port 320 during the third analog time interval 355.

The optical packet 330 arrives at the input port 316 during a fourth analog time interval 360 and therefore is not processed by the digital processing circuitry 310 or the processing is not used to configure the analog switch 305. The analog switch 305 routes the optical packet 330 to the output port 321 based on predetermined configuration information used to configure the analog switch 305 for routing received optical packets from the input port 316 to the output port 321 during the fourth analog time interval 355.

Figure 4:
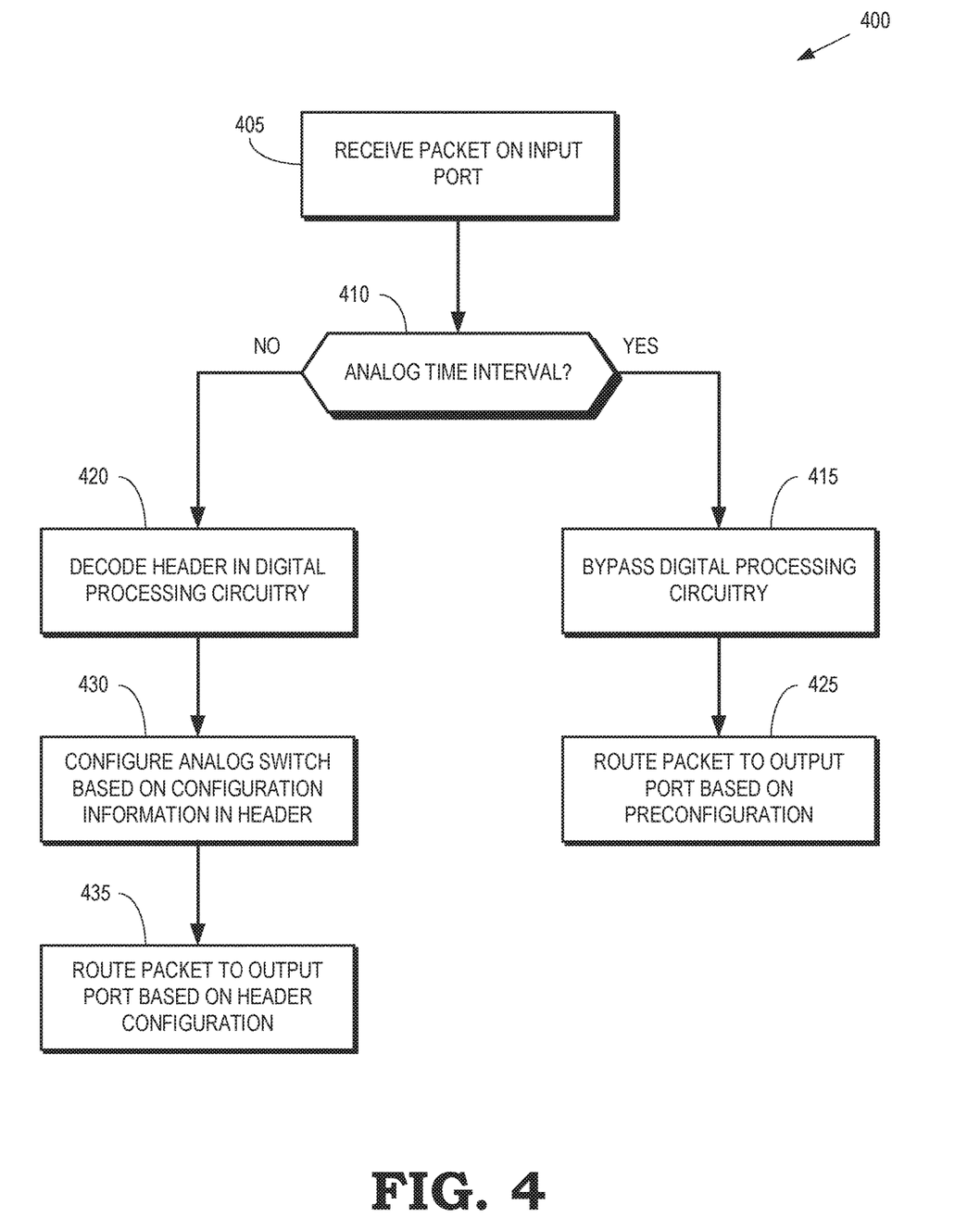
FIG. 4 is a flow diagram of a method of selectively processing deterministic and stochastic traffic based upon arrival times at an optical node according to some embodiments.

FIG. 4 is a flow diagram of a method 400 of selectively routing deterministic and stochastic traffic based upon arrival times at an optical node according to some embodiments. The method 400 is implemented in some embodiments of the optical node 200 shown in FIG. 2.

At block 405, an optical packet is received on an input port of the optical node. Depending on the arrival time of the optical packet at the input port, the optical node processes the optical packet along different paths, e.g., as illustrated in FIG. 2. In some embodiments, the optical packet is duplicated upon ingress to the optical node and copies of the optical packets are directed along both paths. The processing path that is used for the optical packet is determined (at decision block 410) based on the arrival time of the optical packet at the node relative to a set of time intervals that correspond to deterministic traffic. If the arrival time falls within one of the analog time intervals, a first processing path is enabled, which is represented in FIG. 4 as the method 400 flowing to block 415. If the arrival time is outside of one of the analog time intervals, a second processing path is enabled, which is represented as the method 400 flowing to block 420.

At block 415, the optical packet is sent along an optical path that does not include processing by digital processing circuitry in the optical node. The optical packet therefore arrives at the analog (optical) switch without being subjected to any further processing such as OEO conversion. The method 400 then flows to block 425. The optical switch is configured to route optical packets during the analog time intervals prior to the beginning of the analog time interval. Thus, all packets arriving at the optical switch during the analog time interval are routed according to the preconfiguration, regardless of whether the packet is deterministic or stochastic. At block 425, the packet is routed to one of the output ports of the optical node based on the preconfiguration of the optical switch.

At block 420, the optical packet is processed by the digital processing circuitry, which decodes a header in the optical packet. In some embodiments, the digital processing circuitry performs and OEO conversion of an optical header to generate a digital representation of the optical header. Information such as addressing information is then extracted from the decoded header of the optical packet.

At block 430, the analog switch is configured based on the information extracted from the header of the optical packet. For example, the analog switch can be configured to route the optical packet (or an optical payload thereof) from the input port to one or more of the output ports of the analog switch. The optical packet (or an optical payload thereof) is then routed to the appropriate output port based on the header configuration information at block 435.

FIG. 5 is a timing diagram 500 that illustrates timing delays along different paths in a node that selectively transmits optical packets based on arrival times of the optical packets according to some embodiments. The node includes digital and analog paths that represent the optical paths in some embodiments of the optical node 200 shown in FIG. 2. The node includes an analog switch 505 such as the analog switch 205 shown in FIG. 2. The node also includes digital processing circuitry 510 such as the digital processing circuitry 225, 226 shown in FIG. 2. The node further includes input ports 515, 516 and output ports 520, 521, which are represented as arrows to indicate arrival times at the corresponding ports. Time increases from left to right as indicated by the direction of the arrows representing the input ports 515, 516 and the output ports 520, 521.

A sequence of optical packets 525, 526, 527, 528, 529, 530 (collectively referred to herein as "the optical packets 525-530") arrives at the input ports 515, 516. The optical packets 525-530 have different arrival times at the input ports 515, 516 of the node. In some embodiments, the optical packets 525-530 are duplicated and the copies are routed concurrently along the digital and analog transmission paths. The copies are selectively processed in the digital processing circuitry 510 and the analog switch 505 based on their arrival times. In the interest of clarity, only the path that is enabled is shown for the optical packets 525-530. For example, as discussed below, the copy of the optical packet 525 on the analog path is provided to the output node 520 and so only processing along the analog path is illustrated in FIG. 5, even though another copy of the optical packet 525 is concurrently provided to the digital processing circuitry 510.

The input ports 515, 516 are associated with different sets 535, 536 of analog and digital time intervals, respectively. In the illustrated embodiment, the set 535 associates the input port 515 with an analog time interval 540 and optical packets are routed to the output port 520 using a predetermined configuration of the analog switch 505 during the analog time interval 540. For example, the optical packet 525 is processed along an analog path that bypasses the digital processing circuitry 510, as discussed herein. The set 535 also associates the input port 515 with a digital time interval 545 and optical packets are routed to the output ports 520, 521 by the analog switch 505 based on configuration information extracted from the optical packets, as discussed herein. In the illustrated embodiment, the set 536 associates the input port 516 with an analog time interval 550, an analog time interval 555 and an analog time interval 556. Optical packets are routed from the input port 516 to the output port 521 during the analog time interval 550, from the input port 516 to the output port 520 during the analog time interval 555 and from the input port 516 to the output port 521 during the analog time interval 556.

Digital processing in the digital processing circuitry 510 introduces time delays along the digital path through the node. In the illustrated embodiment, optical packet 527 and the optical packet 528 arrive at the corresponding input port 516 and input port 515 during overlapping time intervals. Information in a header of the optical packet 528 is extracted by the digital processing circuitry 510 and used to configure the analog switch 505 to route the optical packet 528 from the input port 515 to the output port 520. The analog switch 505 is preconfigured to route packets arriving at the input port 516 to the output port 520 during the analog time interval 555. Although the arrival times of the optical packets 527, 528 overlap, contention between the optical packet 527 and the optical packet 528 is avoided because processing of the optical packet 528 in the digital processing circuitry 510, e.g., to extract configuration information for the analog switch 505, introduces a time delay 560. In contrast, the optical packet 527 is processed on the analog path and therefore arrives at the output port 520 of the analog switch 505 before the optical packet 528, thereby avoiding contention on the output port 520.

In some cases, the time delay introduced by the digital processing circuitry 510 causes contention on the output ports 520, 521 of the analog switch 505. The optical packet 529 arrives at the input port 515 during the digital time interval 545 and is therefore processed in the digital processing circuitry 510 to extract configuration information that is used to configure the analog switch 505 to route the optical packet 529 from the input port 515 to the output port 521. This processing introduces a delay. The optical packet 530 arrives at the input port 516 during the analog time interval 556 and after the optical packet 529 arrives at the input port 515. The optical packet 530 is processed along the analog path and no additional time delay is introduced by the digital processing circuitry 510. Consequently, the optical packets 529, 530 contend on the output port 521. A controller, such as the controller 220 shown in FIG. 2, performs contention resolution that allows the optical packet 530 access to the output port 521 prior to the optical packet 529. In some embodiments, the controller waits to forward the optical packet 529 to the analog switch 505 until after the analog time interval 556 because the output port 521 is reserved for deterministic packets until the end of the analog time interval 556. Thus, the contention resolution introduces additional delay that, combined with the processing delay in the digital processing circuitry 510, causes a net delay 565 for the optical packet 529.

Selectively routing deterministic and stochastic traffic along transmission paths that include or bypass, respectively, digital processing circuitry in an optical node has a number of advantages over conventional routing of optical packets. Processing of the deterministic traffic by digital processing circuitry in the optical node is bypassed or avoided, which reduces latency for optical packets that arrive during the time intervals that are allocated for deterministic traffic.

Furthermore, this latency advantage can be achieved at low cost. Fast switching matrices in optical switches can be realized by using low-cost silicon photonics integration technologies. For example, the traffic-aware routing techniques disclosed herein leverage OPS technology to implement latency efficient multiplexing of stochastic and deterministic traffic.

Some embodiments of the optical nodes disclosed herein are very energy efficient because they support optical transparency of deterministic transit traffic. In some cases, deterministic traffic is not processed for address or contention resolution while in transit. The capacity of optical nodes can also be increased using traffic-aware routing. Some embodiments of the optical nodes offload the address and contention resolution functionality, which reduces the size of the optical mode. Furthermore, the address and contention resolution can become a data rate bottleneck in high speed switches so offloading this functionality further increases the capacity of the optical node. Thus, more effective capacity transits the optical node while the same complexity of electronic components for address and contention resolution.

The size of an optical packet transited by some embodiments of the optical nodes disclosed herein are not limited for the deterministic traffic because these optical packets travel along the analog (optically transparent) transmission path. The node can therefore support optical circuit connections, which are set-up and tom-down at known times for deterministic traffic. Indeed, if such connections are scheduled at known dates, the proposed OPS switch can also be used at same time for this application, thanks to its operation method. The proposed OPS is a ubiquitous packet and circuit switching node.

In some embodiments, certain aspects of the techniques described above may implemented by one or more processors of a processing system executing software or computer program code. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
  a) hardware-only circuit implementations (such as implementations and only analog and/or digital circuitry) and
  b) combinations of hardware circuits and software, such as (as applicable):
    i. a combination of analog and/or digital hardware circuit(s) with software/firmware and
    ii. any portions of a hardware processor(s) with software (including digital signal processor(s), software, and memory(ies) that work together to cause an apparatus, such as a mobile phone or server, to perform various functions) and
  c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A node configured for deployment in an optical network, the node comprising:
   a first optical path and a second optical path for concurrently conveying an optical packet between input ports and output ports of the node,
   wherein the first optical path comprises digital processing circuitry and an analog switch,
   wherein the second optical path comprises the analog switch and bypasses the digital processing circuitry, and
   wherein the first and second optical paths are selectively enabled in different time intervals.

2. The node of claim 1, wherein the digital processing circuitry is configured to generate, prior to providing the optical packet to the analog switch, first configuration information associated with the optical packet, wherein the analog switch is configured to route the optical packet between the input ports and the output ports based on the first configuration information during a first time interval, and wherein the analog switch is configured, prior to a second time interval, to route the optical packet between the input ports and the output ports based on second configuration information during the second time interval.

3. The node of claim 2, wherein the optical packet is not processed by the digital processing circuitry during the second time interval or the optical packet is processed by the digital processing circuitry during the second time interval but results of the processing are not used to configure the analog switch during the second time interval.

4. The node of claim 2, wherein the optical packet comprises an optical header and an optical payload, and wherein the digital processing circuitry is configured to convert the optical header to an electrical signal and to provide the optical payload to the analog switch.

5. The node of claim 4, wherein the digital processing circuitry is configured to generate a digital representation of the electrical signal and to perform at least one of address resolution and contention resolution based on the digital representation.

6. The node of claim 5, wherein the digital processing circuitry is configured to generate the first configuration information based on results of at least one of the address resolution and the contention resolution.

7. The node of claim 2, wherein the digital processing circuitry is configured to receive out-of-band information representative of the first configuration information, perform at least one of address resolution and content resolution based on the out-of-band information, and generate the first configuration information based on results of the at least one of address resolution and content resolution.

8. The node of claim 2, further comprising:
   a controller to configure the analog switch based on at least one of the first configuration information received from the digital processing circuitry during the first time interval and the second configuration information prior to the second time interval.

9. The node of claim 8, wherein the controller and the digital processing circuitry are configured to exchange information to perform contention resolution.

10. The node of claim 2, wherein the first time interval is associated with stochastic traffic, and wherein the second time interval is associated with deterministic traffic having predetermined arrival times at the node.

11. A method comprising:
    receiving, at a node in an optical network, an optical packet comprising an optical header and an optical payload;
    in response to the optical packet arriving during a first time interval, configuring an optical switch in the node based on first configuration information in optical header of the optical packet and subsequently providing the optical payload of the optical packet to the optical switch; and
    in response to the optical packet arriving during a second time interval, providing the optical packet to the optical switch that was configured using second configuration information prior to the second time interval.

12. The method of claim 11, further comprising:
    converting a portion of the optical packet to an electrical signal; and
    generating a digital representation of the electrical signal.

13. The method of claim 12, wherein converting the portion of the optical packet to the electrical signal comprises converting the optical header to the electrical signal.

14. The method of claim 12, further comprising:
performing at least one of address resolution and contention resolution based on the digital representation.

15. The method of claim 14, wherein generating the first configuration information comprises generating the first configuration information based on results of at least one of the address resolution and the contention resolution.

16. The method of claim 11, further comprising:
receiving out-of-band information representative of the first configuration information;
performing at least one of address resolution and content resolution based on the out-of-band information; and
generating the first configuration information based on results of the at least one of address resolution and content resolution.

17. The method of claim 11, wherein configuring the optical switch comprises configuring, using a controller, the optical switch based on at least one of the first configuration information received at the controller from digital processing circuitry during the first time interval and the second configuration information.

18. The method of claim 17, further comprising:
configuring the optical switch to route the optical packet based on the second configuration information prior to the second time interval.

19. The method of claim 11, wherein the first time interval is associated with stochastic traffic, and wherein the second time interval is associated with deterministic traffic having predetermined arrival times at the node.

20. An apparatus comprising:
at least one processor; and
at least one memory including computer program code;
the at least one memory and the computer program code configured to, with the at least one processor, cause the apparatus at least to perform:
receiving, at a node in an optical network, an optical packet comprising an optical header and an optical payload;
in response to the optical packet arriving during a first time interval, configuring an optical switch in the node based on first configuration information in the optical payload of the optical packet and subsequently providing a second portion of the optical packet to the optical switch; and
in response to the optical packet arriving during a second time interval, providing the optical packet to the optical switch that was configured using second configuration information prior to the second time interval.

21. The apparatus of claim 20, wherein the at least one memory and the computer program code are configured to, with the at least one processor, cause the apparatus at least to perform:
converting the optical header of the optical packet to an electrical signal in response to the optical packet arriving during the first time interval; and
providing the optical payload of the optical packet to the optical switch.

22. The apparatus of claim 21, wherein the at least one memory and the computer program code are configured to, with the at least one processor, cause the apparatus at least to perform at least one of address resolution and contention resolution based on a digital representation of the electrical signal and perform generating the first configuration information based on results of at least one of the address resolution and the contention resolution.

23. The apparatus of claim 20, wherein the at least one memory and the computer program code are configured to, with the at least one processor, cause the apparatus at least to perform:
receiving out-of-band information representative of the first configuration information;
performing at least one of address resolution and content resolution based on the out-of-band information; and
generating the first configuration information based on results of the at least one of address resolution and content resolution.

\* \* \* \* \*